Jan. 29, 1935.  O. HENNEBERGER  1,989,449
CAMERA
Filed Sept. 2, 1933  2 Sheets-Sheet 1
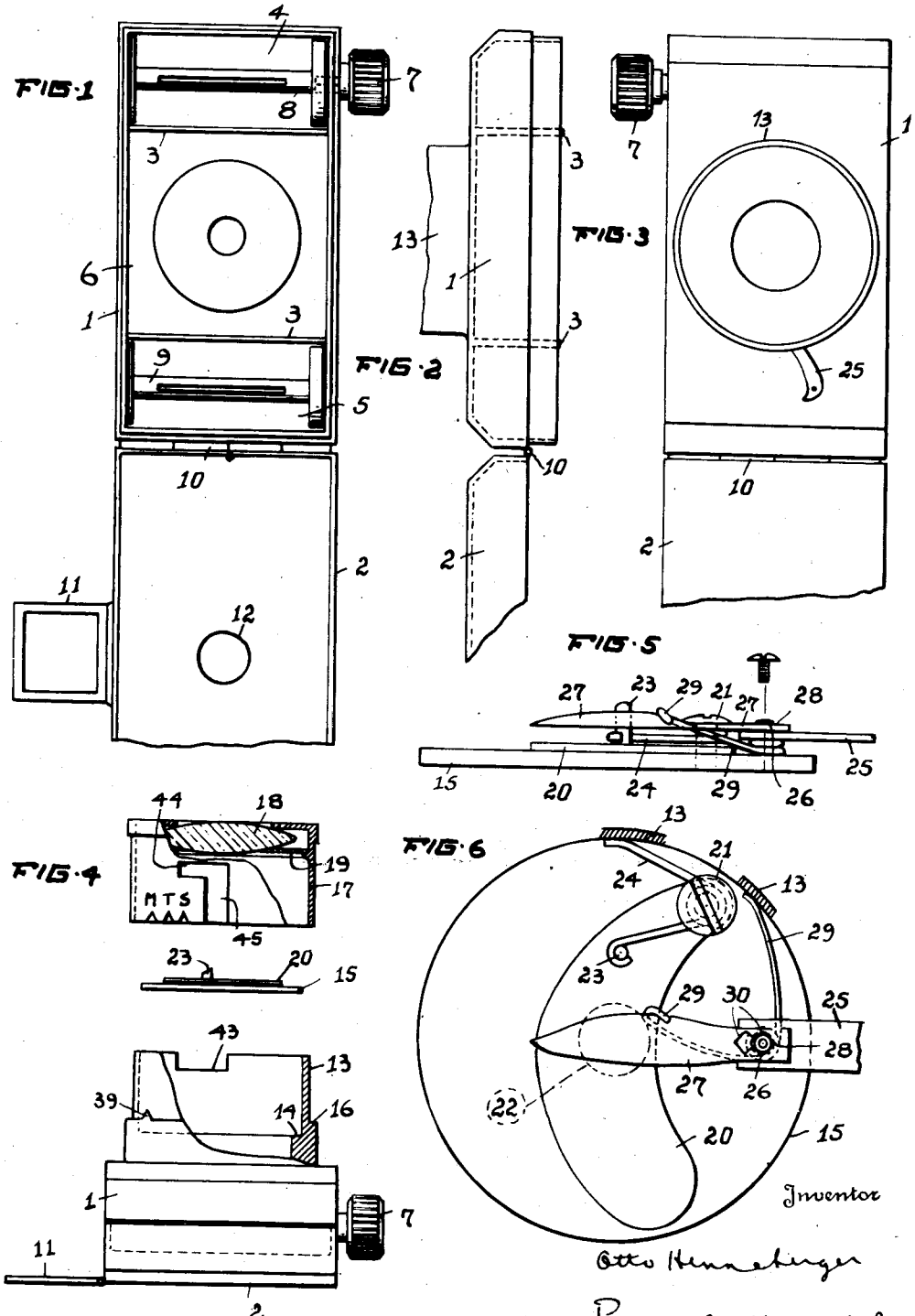

Jan. 29, 1935.　　　　O. HENNEBERGER　　　　1,989,449
CAMERA
Filed Sept. 2, 1933　　　2 Sheets-Sheet 2
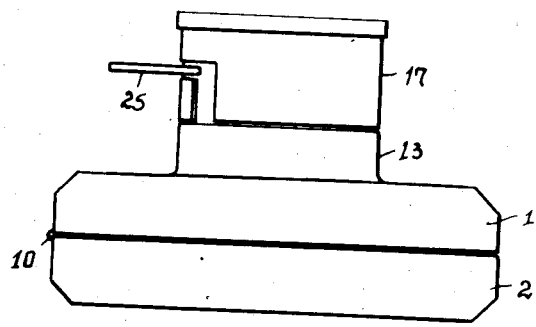
FIG. 7
FIG. 8　　　　FIG. 9
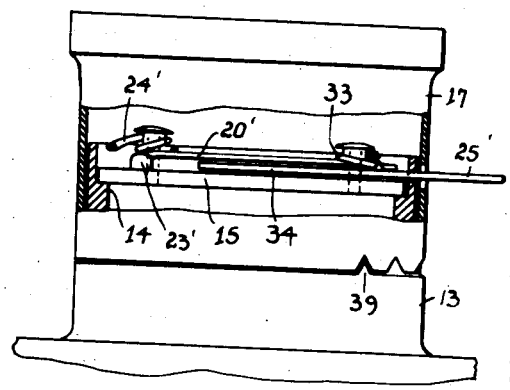 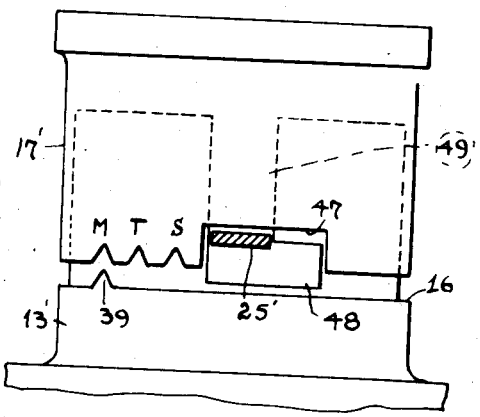
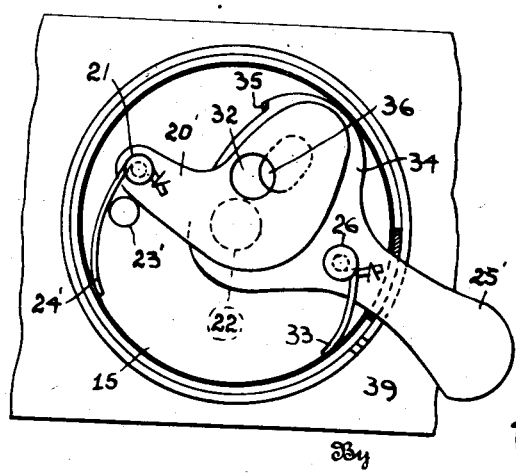
FIG. 10
Inventor
Otto Henneberger
By Percy H. Moore
Attorney Patented Jan. 29, 1935

1,989,449

UNITED STATES PATENT OFFICE 1,989,449

CAMERA

Otto Henneberger, Nuremberg, Germany, assignor to Harold Arthur Moore, New York, N. Y.

Application September 2, 1933, Serial No. 688,047
In Germany December 16, 1932

8 Claims. (Cl. 95—31)

This invention relates to a vest pocket camera and has the object of making the camera of very small dimensions and in a small space providing a simple device which makes it readily possible to provide a lens shutter which will give different exposures.

The invention is illustrated by way of example in the accompanying drawings:

Figures 1 to 3 inclusive show the camera open, Figure 1 being a view of the interior; Figure 2 a side elevation and Figure 3 a front elevation. Figure 4 is an exploded view showing the diaphragm, cap and lens mount. Figures 5 and 6 are enlarged views showing the diaphragm and the shutter device; Figure 5 being a side elevation and Figure 6 a plan. Figure 7 shows the assembled camera. Figures 8 and 9 show a modified form of the shutter device, Figure 8 being a side elevation partly in section of the assembled device and Figure 9 being a plan view. Figure 10 shows a modified arrangement for setting the shutter for instantaneous and time exposures.

The arrangement shown in Figs. 1 to 6 is as follows: The casing consisting of two parts 1, 2 carries in its front part 1 two transverse ribs 3 extending up to the back edge which support the film, determine the height of the picture and with the upper and lower end walls of the front part of the casing enclose two upper and lower end chambers 4, 5. A third and intermediate chamber 6 is enclosed between the ribs 3 and the side walls of the front casing part. The spool of film is placed in the lower chamber 5 while the film winding device 7 projects into the upper chamber 4 so that the exposed film can be wound up in the upper chamber. The film runs on spools 8 and 9 which are placed in the chambers 4 and 5 respectively without special guiding or bearing means.

The rear part 2 of the casing, which is connected with the front part 1 by a hinge 10, carries the folding finder 11 and has an opening 12 which can be closed with a transparent red disk for observing the numbers or the like of the film. Both parts 1, 2 of the casing are formed of suitable metal and are preferably made by die-casting.

The lens mount 13 is preferably formed integral with the front part 1 of the casing, and has an inner shoulder 14 against which the centrally apertured metal disk or diaphragm 15 is placed and an outer shoulder 16 against which the lower end of the lens cap or carrier 17 for the lens or objective 18 bears. The lens 18 is supported in any suitable manner, for example by means of ring 19.

A shutter 20 pivotally mounted at one side of the plate 15, on a pin 21 and normally covering opening 22 has a driving pin 23, the end surface of which slopes backwards. The pin 23 engages with one arm of a spring 24 mounted on the pin 21, the other arm of which bears against the lens mount 13. A release lever 25 pivotally mounted on a pin 26 carried by the diaphragm 15, has an arm 27 fixedly secured thereto by means of a square pin 28. By moving the release lever 25 downwards, or in a clockwise direction the curved outer end of arm 27 engages the pin 23 and forces the shutter in anti-clockwise direction. The diaphragm aperture 22 is thus exposed or opened and will remain so until the arm 27 passes below or beyond the pin 23 of the shutter 20 whereupon the shutter 20 returns to its original position under the influence of the spring 24 engaging with the pin 23.

When relieved of the pressure exerted by the operator's thumb the release lever 25 is returned to normal or Fig. 6 position by a two-armed spring 29 mounted on the pin 26, one arm of which acts on the part 27 of the lever while its other arm bears against the lens mount 13. The end of arm 27 is preferably somewhat flexible, and the arm is also somewhat loosely mounted on the pin 28 for slight rocking movement in a plane parallel to the axis of the pin 28 so that the arm 27 will move freely over the oblique surface of the driving pin 23 during its return to its initial position. The time of exposure can be adjusted as desired, by utilizing one or the other of the two openings 30 which are adapted to receive the square pin 28 on the body of lever 25, thus increasing or decreasing the length of the shutter lever arm 27 and the length of time required for this arm to pass pin 23.

The construction of the lens mount and lens carrier and cap are such that the throw of the shutter lever 25 can be regulated at will to effect instantaneous and time exposures. In order to bring the lens cap easily into the appropriate positions and to hold it there it is provided with a plurality of wedge-shaped notches M, T and S respectively adapted to receive a nose 39 provided on the lens mount 13 so that cap 17 will be automatically fixed in the required position when pushed home against the shoulder 16. These notches indicate respectively momentary or instantaneous exposure, time exposure and safety positions.

Lens mount 13 is provided with a short arcuate cut out portion 43 in its inner edge, which registers with a correspondingly shaped short slot 44 in the lens cap 17, through which the lever 25 extends. A second slot 45 formed in the lens cap 17 at right angles to and communicating with the arcuate slot 44 and extending from the latter to the inner edge of the cap facilitates assembly of the cap after the lever 25 and associated parts have been put in place.

When notch M is seated over the wedge shaped nose 39, lever 25 can be moved sufficiently to carry the arm 27 beyond the pin 23 for instantaneous exposure of opening 22. However when the cap is rotated to bring notch T into register with nose 39, the end wall of arcuate slot 44 limits the throw of lever 25 so that the arm 27 of the latter will not ride beyond pin 23. Movement of lever 25 is thus halted when the opening 22 has been exposed, and a time exposure is then had by the operator holding the lever against automatic return movement for the desired length of time. When nose 39 is seated in notch S movement of lever 25 will be completely blocked.

In the modified form of shutter device shown in Figures 8, 9 and 10 the diaphragm 15 is arranged on the inner shoulder 14. On this diaphragm there is mounted a shutter 20' acted upon by a spring 24' which has a circular aperture 32 which can be brought into coincidence with the diaphragm aperture 22. The release lever 25' pivotally mounted on a pin 26 and provided with a return spring 33' is enlarged at its inner end as at 34 and has an opening 36 adapted to uncover the aperture 22 of the diaphragm 15, when the lever is moved in an anti-clockwise direction. During this movement the shutter 20' is engaged by an upwardly projecting nose 35 on the enlarged portion 34 of the release lever 25' and is carried with this portion 34 against the tension of spring 24' to such an extent that the openings 32 and 36 coincide with the diaphragm aperture 22. As soon as this has happened the shutter 20' runs up the oblique surface of the release pin 23' mounted on the diaphragm and slides back over the nose 35 of the release lever 25', and thereby closes the diaphragm aperture 22.

The modified construction of the lens mount and lens carrier in Figures 8, 9 and 10 also permits regulation of the throw of the shutter lever 25 at will to effect instantaneous and time exposures. Thus lens cap 17' is provided with a short arcuate cut out portion 47 in its inner edge which registers with a correspondingly shaped short slot 48 in the lens mount 13' through which lever 25' extends. A second slot 49 formed in the lens mount 13' at right angles to and communicating with the arcuate slot 48 and extending from the latter to the edge of the lens mount, facilitates assembly of the cap after the lever 25' and associated parts have been put in place.

What I claim is:

1. A vest pocket camera comprising a die-cast two-part casing with lens mount, an inner shoulder on the lens mount, a perforated diaphragm mounted on the shoulder, a shutter mounted on the diaphragm, a spring holding the shutter in closed position, a release lever for said shutter and a spring controlling the release lever.

2. A vest pocket camera as claimed in claim 1 wherein the shutter carries a driving pin having its end surface sloping backwardly, and the release lever is provided with an inwardly-projecting arm adapted to cooperate with the driving pin in such a manner that the shutter exposes the perforation of said diaphragm for the desired time.

3. A vest pocket camera comprising a two-part metal casing with lens mount, a diaphragm in the lens mount, a shutter mounted on the diaphragm, a spring holding the shutter in closed position, a lens cap adjustably mounted on said lens mount formed with a slot, said lens mount having a cut out portion registering with said slot, and a release lever extending through said slot, and means for fixing the lens cap in adjusted position on said lens mount.

4. A vest pocket camera comprising a two-part metal casing with lens mount, a diaphragm in the lens mount, a shutter mounted on the diaphragm, a spring holding the shutter in closed position, a lens cap adjustably sleeved on said lens mount, said lens mount and cap being formed with registering openings, a release lever extending through said registering openings, and means for fixing said lens cap in adjusted position on said lens mount.

5. A vest pocket camera comprising a die-cast two-part casing with a lens mount, an inner shoulder on the lens mount, a perforated diaphragm mounted on said shoulder, a perforated shutter mounted on said diaphragm, a spring holding the shutter in closed position, a spring controlled release lever, a perforated enlargement at the end of said release lever, and a nose on said enlargement for coupling said lever with the shutter, said rotor being adapted to be driven by said release lever to cause the perforations of said shutter, enlargement of said lever and diaphragm to coincide with each other when said release lever is actuated.

6. A vest pocket camera comprising a two-part casing with a lens mount, an inner shoulder on the lens mount, a perforated diaphragm mounted on said shoulder, a perforated shutter mounted on said diaphragm, a spring holding the rotor in closed position, a spring controlled release lever, a perforated member coupled with said release lever, a nose on said disk for coupling said shutter with said disk and a pin on the diaphragm having a sloping end face, over which the shutter can slide so as to be brought out of engagement with the nose of the perforated member and to be returned to its original position by its spring.

7. A vest pocket camera comprising a die-cast two part casing with lens mount, a shutter mechanism within said lens mount, and a lens carrier rotatably supported upon said lens mount and adapted to lock said shutter mechanism for preventing operation thereof.

8. A vest pocket camera comprising a die-cast two part casing with a lens mount, a shutter mechanism within said lens mount having a release lever extending through a slot in the wall of said mount, and a lens carrier rotatably supported on said lens mount, said lens carrier being adapted to lock said release lever for preventing operation of said shutter.

OTTO HENNEBERGER.